Feb. 15, 1927.

R. F. SERGEL ET AL 1,617,773

EDUCATIONAL CARD GAME

Filed Feb. 20, 1926

INVENTORS

Patented Feb. 15, 1927.

1,617,773

UNITED STATES PATENT OFFICE.

RUTH F. SERGEL AND LINDA H. MEYERS, OF PITTSBURGH, PENNSYLVANIA.

EDUCATIONAL CARD GAME.

Application filed February 20, 1926. Serial No. 89,663.

The present invention relates to a game played with cards, and particularly to a game wherein the cards have a certain educational value whereby a game which is both instructive and entertaining is secured.

According to the present invention, it is proposed to have a game composed of a deck of cards divided into a plurality of suits, each suit being representative of a class or genus of natural objects. Each suit is comprised of several cards each bearing a pictorial representation of a different specie of natural object in the genus of the suit to which it belongs.

The nature of the invention may be more readily understood by reference to the accompanying drawings which illustrate a typical embodiment of the invention, but the invention is not confined to the particular arrangement therein designated or to the particular pictorial illustrations therein shown.

In the drawings:

Figure 1 designates all of the cards of one suit or book in the deck;

Figure 1:
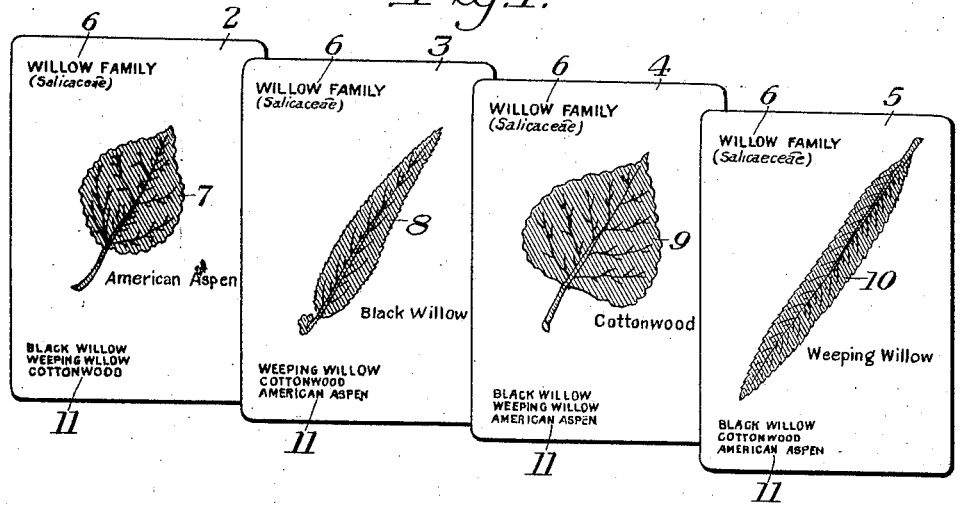

Referring to Figure 1, there is shown one complete book or suit of cards taken from the deck. As illustrated there are four cards in this suit, although the number may be varied as may be desired. The cards are designated as 2, 3, 4 and 5, and each card bears a designation 6 which is a suit or book designation. This designation pertains to some scientific classification arranged according to a class or genus of natural objects. We have shown a game wherein plant or tree life is depicted and in Figure 1 have illustrated four different individual species of plants belonging to the same general class. This class or genus is the suit designation 6. The several cards 2, 3, 4 and 5 bear pictures 7, 8, 9 and 10, illustrating different species of plant life classified under the genus designation 6. Each picture bears the name or species designation of the plant or tree to which it relates. Each card also bears a list of the names of other species of plants or trees found in this particular genus and represented on other cards of the suit. This list of names is designated 11 in Figure 1.

Referring to Figure 1, it will be seen that there are illustrated leaves from four different trees belonging to the willow family or genus. These are the American aspen, the black willow, the cottonwood and the weeping willow.

Figure 2:
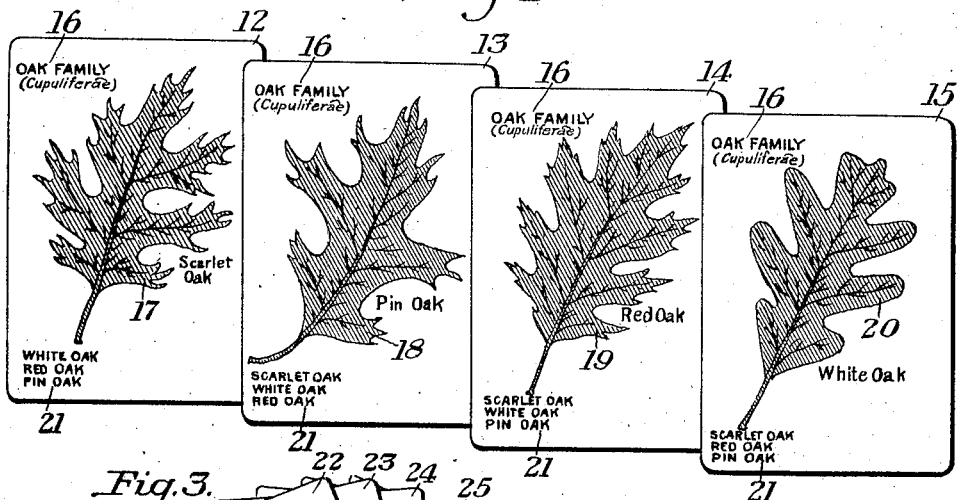
Figure 2 shows all of the cards in another suit or book.

In Figure 2 there is illustrated another complete book or suit illustrating another family or genus of plant life. The several cards of the book are designated 12, 13, 14 and 15, and each has thereon the family or genus designation at 16. Each card also bears a picture representation of foliage, as indicated at 17, 18, 19 and 20, respectively. Each card also contains a list of the names of other plants or trees found in the same family, this list of names being designated 21 on each of the cards and corresponds to the list 11 in Figure 1. In Figure 2 I have illustrated, as an example, different species of the oak family.

In the deck of cards there may be any desired number of books or suits, as illustrated in Figure 1 and Figure 2. Most of the books or suits will have the same number of cards. However, it is preferred that there be at least one master suit having more cards therein than most of the other books of the deck.

Figure 3:
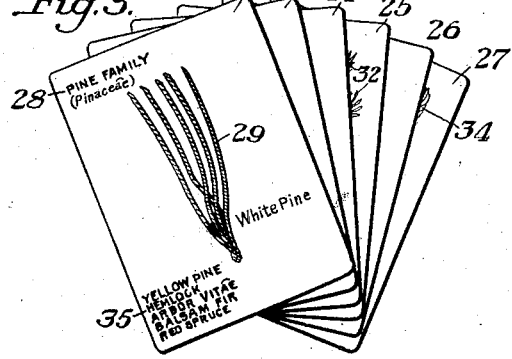
Figure 3 shows the cards contained in a third suit, which may be designated a master suit.

In Figure 3 I have illustrated the cards of the master suit or book. It preferably has six cards if the remaining books have four cards. Each of these cards, designated 22, 23, 24, 25, 26 and 27 is arranged similarly to the cards shown in Figures 1 and 2, having a family or genus designation, at 28, and having pictures indicative of different species thereon, at 29, 32 and 34, respectively. Each of these cards also bears a list, designated 35, of the names of the other trees or plants in the master suit. All of the cards in the master suits, like all of the cards in each of the other suits, is representative of a species whose family or genus is the suit designation.

In playing the game there may be a deck composed of say fifty cards consisting of twelve books, eleven of which have four cards each and one of which has six cards. The six-card suit or book may be designated the master suit.

If four players are playing the game, each player may receive a designated number of cards, say five, while the remaining cards are placed in the center of the table. The players then take turns in calling on one another for a given card and in drawing from the remaining cards on the center of the table in an effort to complete suits or books. Whenever a player completes a suit or book, he lays it face upward on the table and the first player to lay a card from the master suit on that book "takes" or "captures" the book. Inasmuch as there are a less number of cards in the master suit than the total number of books in the deck, the players may wait until several books have been laid face upward on the table, one on top of another, and the first player to lay a card of the master suit on the stack of books which has accumulated will, with one card, take several books. The object of the game, of course, is to take the greatest number of books.

It will be seen that, in playing the game, the players become familiarized with the different species of natural objects in a class or genus and become familiarized with the scientific grouping of different natural objects. The invention is particularly well suited to a game wherein trees and forms of plant life are pictured, and is particularly instructive when used in a game where different forms of plant life are shown. As a general rule, the leaf of the tree or plant is pictured as it is the best general identifying means for any given tree or plant.

By reason of the fact that there is a master suit whose total number of cards is greater than the total number of cards in any other suit or book, and by reason of the fact that the total number of cards in the master suit is less than the number of books, the game may be made very entertaining, as well as instructive, for the reason that it enables several players to compete for the capture of several books at once, and provides a game in which there is considerably more interest than a game wherein there are an equal number of cards in every suit.

While we have illustrated in Figures 1 and 2 the cards from the willow and oak families, respectively, it will be understood that in a deck of fifty cards there would be other families, such, for instance, as the maple, the willow, pea, magnolia, olive, walnut, birch, rose, mulberry, and elm. We have shown the pine group as being the master group or suit.

It will be obvious, however, that other varieties of natural objects could be pictured in place of those specifically illustrated or described, such as insects or minerals; and that different forms of plant life can be depicted, the invention not necessarily being confined to trees or to the leaves of trees, but to include herbs and grasses and grains just as well.

We claim as our invention:

1. A game comprising a deck of cards having a plurality of suits, each comprised of several different cards, each suit being designated by a genus of natural objects, the several cards of each suit being designated as different species of that genus, one of the suits being a master suit and having more cards of the same genus than any of the other suits.

2. A game comprising a deck of cards having a plurality of suits, each comprised of several different cards, each suit being designated by a genus of natural objects, the several cards of each suit being designated as different species of that genus, one of the suits being a master suit and having more cards of the same genus than any of the other suits, the total number of cards in the master suit being greater than the number of cards in any other suit and less than the total number of suits in the deck.

3. A game comprising a deck of cards having a plurality of suits, each comprised of several different cards, one card of each suit bearing a pictorial representation of one specie of natural objects in the general class of which the suit is composed and also bearing the name of every other specie in that class, several of the suits having the same number of cards therein, one of said suits covering a greater number of species than the majority of the suits.

In testimony whereof we have hereunto set our hands.

RUTH F. SERGEL.
LINDA H. MEYERS.